United States Patent [19]
Clegg

[11] Patent Number: 4,579,429
[45] Date of Patent: Apr. 1, 1986

[54] CONCENTRATED-BEAM ILLUMINATION

[76] Inventor: John E. Clegg, 2320 Keystone Dr., Orlando, Fla. 32806

[21] Appl. No.: 653,262

[22] Filed: Sep. 24, 1984

[51] Int. Cl.⁴ ............................................. G02B 21/06
[52] U.S. Cl. ..................................................... 350/523
[58] Field of Search ........................ 350/432, 509, 526

[56] References Cited
U.S. PATENT DOCUMENTS

| | | | |
|---|---|---|---|
| 3,736,041 | 5/1973 | McArthur | 350/526 |
| 4,148,552 | 4/1979 | Suzuki et al. | 350/526 |
| 4,241,251 | 12/1980 | Yonekubo | 350/526 |
| 4,277,148 | 7/1981 | Clegg | 350/432 |
| 4,333,713 | 6/1982 | Clegg | 350/432 |
| 4,469,411 | 9/1984 | Clegg | 350/414 |
| 4,521,085 | 6/1985 | Clegg | 350/432 |

Primary Examiner—John K. Corbin
Assistant Examiner—Vincent J. Lemmo

[57] ABSTRACT

An illuminator for microscopes consisting of a light source, five mirrors and two conical beam concentrators mounted in the base of the microscope. Three intensities of illumination are possible; low intensity of a 50 mm beam emitted by an incandescent bulb, high intensity of the beam reduced to 10 mm diameter by the first beam concentrator, and very high intensity of the beam reduced to 2 mm diameter by the second beam concentrator.

1 Claim, 4 Drawing Figures

CONCENTRATED-BEAM ILLUMINATION

BACKGROUND

Prior art is limited to illuminators with speherical condensors and filters. These illuminators lack the advantage of conical beam concentrators in that they do not receive and emit parallel afocal beams. The beams received and emitted by concial lenses are parallel and afocal, and interference is reduced to a minimum.

The concentrated-beam illuminator is designed specifically for use with the *Quadrant Conical-Lens Microscope,* U.S. Pat. No. 4,469,411, issued Sept. 4, 1984, by this inventor. This microscope has eight 90° longitudinal sectors of conical stage lenses which can be revolved into and out of the line of sight. A major disadvantage of the microscope is that the magnified image must pass through six lens surfaces in each stage, and this creates a problem of light penetration.

The problem of light penetration is partially solved by use of conical beam concentrators to increase the intensity of illumination. The beam concentrators are conical microscopic lenses disclosed in *Conical Split-Image Microscopic Lens,* U.S. Pat. No. 4,277,148, issued July 7, 1981, by this inventor.

DRAWINGS

DESCRIPTION

Figure 1:
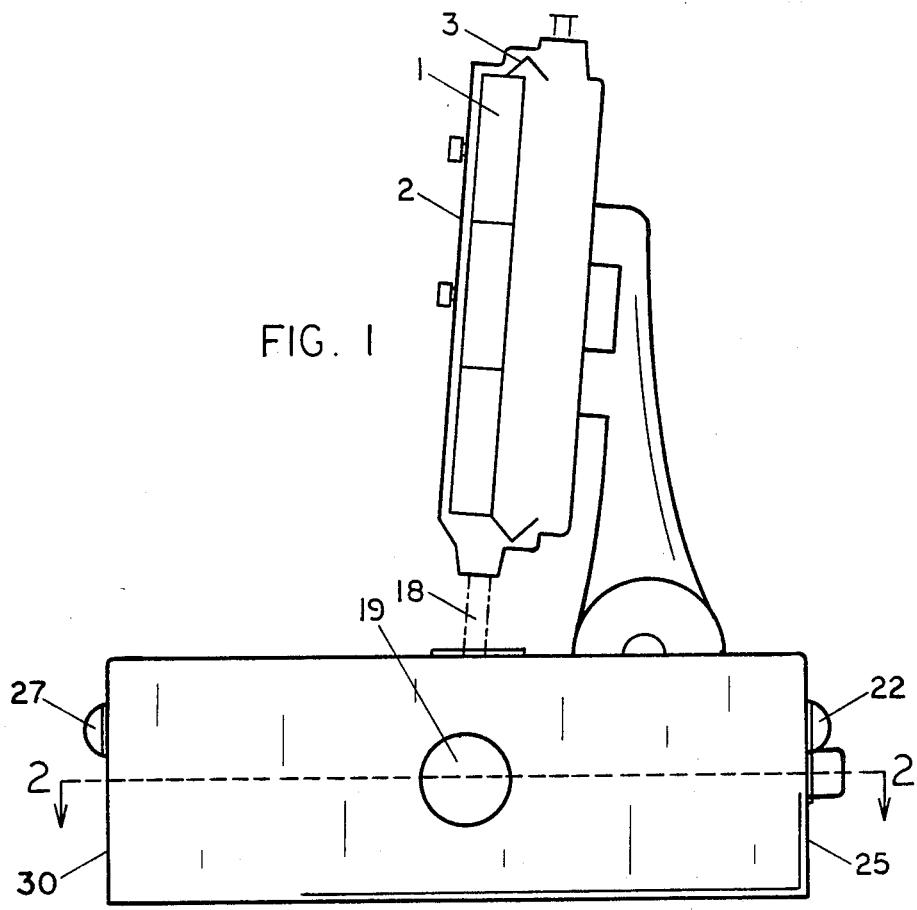
FIG. 1 is an elevation of a quadrant conical-lens microscope mounted on a concentrated-beams illuminator.

The quadrant microscope of FIG. 1 has six quadrant conical stage lenses 1 mounted in a double microscope tube 2. The lowest stage is fixed, the next two stages are rotated into the line of sight, and the three remaining stages in the rear tube are rotated out of the line of sight. The image emitted at the top of the front tube is reflected by mirrors 3 to the bottom of the tube and then reflected up through the eyepiece.

Figure 2:
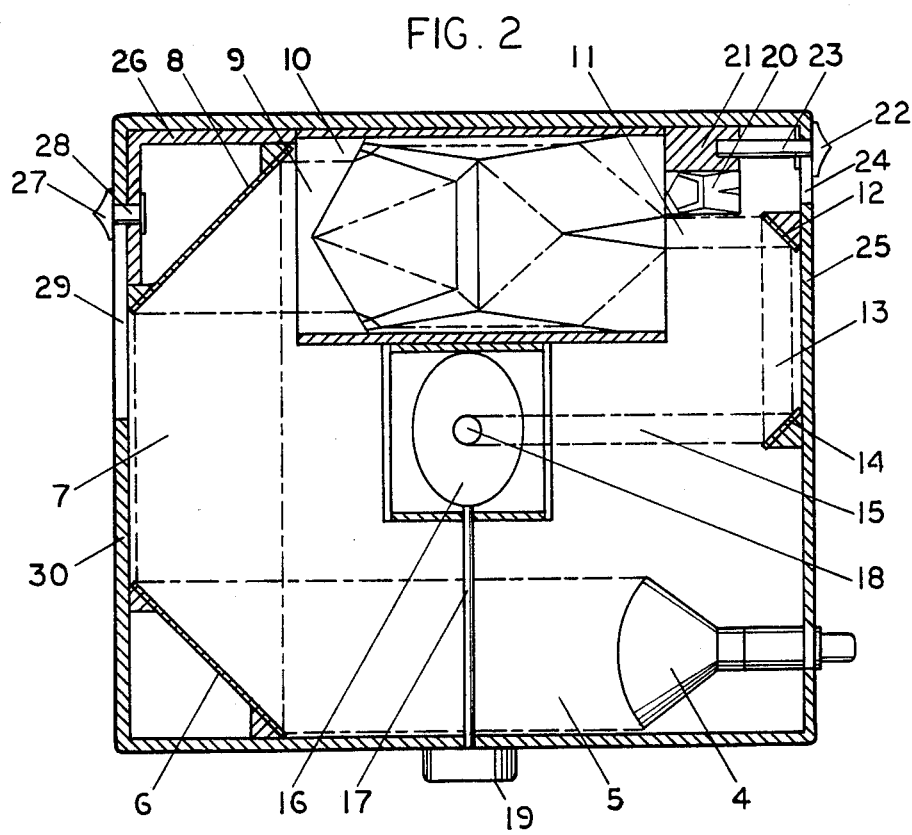
FIG. 2 is a horizontal cross section of the concentrated-beam illuminator taken on line 2—2 of FIG. 1.
Figure 3:
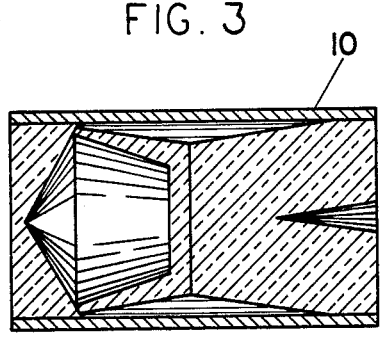
FIG. 3 is an elevation of the first conical beam concentrator with the lenses shown in section.
Figure 4:
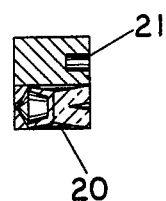
FIG. 4 is an elevation of the second conical beam concentrator with the lenses shown in section.

FIG. 2 shows the light source as an incandescent bulb 4 which emits a beam 5 of 50 mm diameter in the horizontal plane.

First mirror 6 is mounted in the vertical plane at an angle of 45° to beam 5. Beam 7 is reflected at an angle of 90° to beam 5.

Second mirror 8 is mounted in the vertical plane at an angle of 45° to beam 7. Beam 9 is reflected at an angle of 90° to beam 7.

First conical beam concentrator 10 is mounted in the horizontal plane so as to intercept and reduce the diameter of beam 9 from 50 mm to 10 mm, emitting beam 11.

Third mirror 12 is mounted in the vertical plane at and angle of 45° to beam 11. Beam 13 is reflected at an angle of 90° to beam 11.

Fourth mirror 14 is mounted in the vertical plane at an angle of 45° to beam 13. Beam 15 is reflected at an angle of 90° to beam 13.

Fifth mirror 16 is mounted on pivoting rod 17 in the center of the illuminator and occupies the oblique plane between vertical and horizontal at an angle of 45° to beam 15 and reflects beam 18 up through the specimen at an angle of 90° to beam 15. Fifth mirror 16 is rotated by knob 19.

Second beam concentrator 20 is mounted on block 21 which is connected to button 22 by pin 23 which passes through slot 24 in rear wall 25 of the illuminator. Second beam concentrator 20 can be moved into alignment between first beam concentrator 10 and third mirror 12 to reduce the diameter of beam 11 from 10 mm to 2 mm.

Second mirror 8 is mounted on sliding frame 26 which is connected to buttom 27 by pin 28 which occupies slot 29 in front wall 30. Second mirror 8 can be moved into alignment with fifth mirror 16 to produce direct illumination.

I claim:

1. A concentrated-beam illuminator for microscopes comprising in general a light source which emits a 50 mm beam, two conical beam concentrators which can be moved into the line of projection of the beam so as to reduce the diameter and increase the intensity of the beam, and five mirrors which reflects the beam; and comprising in particular:

a light source comprising an incandescent lamp (4) which emits a 50 mm beam (5) in the horizontal plane, a first mirror (6) mounted in the vertical plane at an angle of 45° to beam (5) so as to reflect beam (5) at an angle of 90° , forming beam (7), a second mirror (8) mounted in the vertical plane at an angle of 45° to beam (7) so as to reflect beam (7) at an angle of 90° , forming beam (9), a first conical beam concentrator (10) mounted in the horizontal plane between second mirror (8) and third mirror (12) so as to intercept and refract beam (9), forming concentrated afocal 10 mm beam (11), a second conical beam concentrator (20) mounted in the horizonatal plane between first conical beam concentrator (10) and third mirror (12) so as to intercept and refract beam (11), forming a concentrated afocal 2 mm beam, a third mirror (12) mounted in the vertical plane at an angle of 45° to beam (11) so as to reflect beam (11) at an angle of 90° , forming beam (13), a fourth mirror (14) mounted in the vertical plane at an angle of 45° to beam (13) so as to reflect beam (13) at an angle of 90° , forming beam (15), and a fifth mirror (16) mounted in the oblique plane between the vertical and horizontl planes at an angle of 45° to beam (15) so as to reflect beam (15) upward at an angle of 90° , forming beam (18) which illuminates the specimen.

* * * * *